No. 853,058. PATENTED MAY 7, 1907.
R. S. BRYANT.
WHEEL RIM.
APPLICATION FILED APR. 13, 1905.
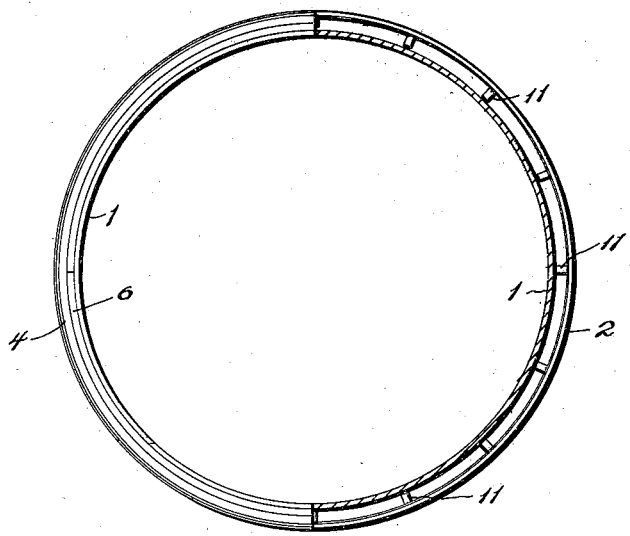
Fig. 1.
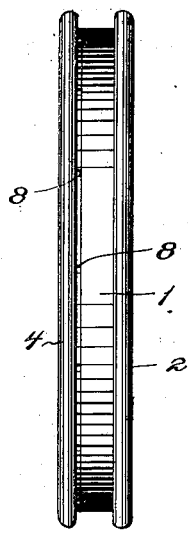
Fig. 2.
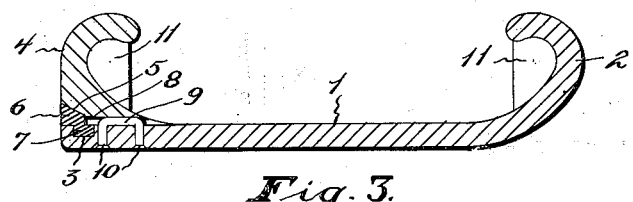
Fig. 3.
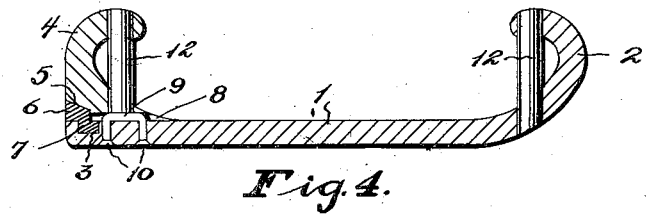
Fig. 4.
Fig. 5.
WITNESSES:
Carl Staughton
INVENTOR
Richard S. Bryant
BY
ATTORNEYS

UNITED STATES PATENT OFFICE.

RICHARD S. BRYANT, OF COLUMBUS, OHIO.

WHEEL-RIM.

No. 853,058.　　　Specification of Letters Patent.　　　Patented May 7, 1907.

Application filed April 13, 1905. Serial No. 255,434.

*To all whom it may concern:*

Be it known that I, RICHARD S. BRYANT, a citizen of the United States, residing at Columbus, in the county of Franklin and State of Ohio, have invented certain new and useful Improvements in Wheel-Rims, of which the following is a specification.

My invention relates to a new and useful improvement in motor vehicle wheel rims.
The object of the invention is to produce a rim of the detachable flange type provided with means for fastening the tire in place and preventing creeping of the same on the rim.

Another feature resides in means for locking the detachable flange against movement independent of the rim and in some instances employing a portion of this locking means to fasten the tire in place and prevent the hereinbefore mentioned creeping of the same.
Finally the object of the invention is to provide a device of the character described that will be strong, durable, efficient and simple and comparatively inexpensive to make and one in which the several parts will not be liable to get out of working order.

With the above and other objects in view, the invention consists of the novel details of construction and operation, a preferable embodiment of which is described in the specification and illustrated in the accompanying drawings, wherein—

Figure 1 is a view of my improved rim partly in elevation and partly in vertical section. Fig. 2 is a plan view. Fig. 3 is a transverse sectional view. Fig. 4 is a transverse sectional view showing a modified form of tire fastening means, and Fig. 5 is a transverse sectional view of still another modified form, showing a portion of the rim fastening means extended to provide means for fastening the tire in place.

My present invention has been designed as an improvement on the construction of my wheel rims illustrated in the patent granted to me October 11th, 1904, and numbered 772,209.

In the drawings the numeral 1 designates the rim body which is curved upwardly and bent over at one side to form the fixed clencher flange 2, while at its opposite side it is extended preferably so as to form an alined portion which is provided with an angular groove 3 near the outer edge of the rim and extending circumferentially thereof.
A detachable clencher flange 4 is shaped to fit snugly on the rim body with its outer face flush with the outer edge of the said body. The lower outer corner of the said flange 4 is beveled or inclined as indicated at 5 so as to receive the beveled or inclined portion of a split locking ring 6. The locking ring 6 is formed with an inset angular portion 7 which fits in and completely fills the angular groove 3. This locking ring is of the sort shown in my patent aforesaid No. 772,209, it being formed of a strip of elastic metal with its ends adapted to come automatically together after it has been seated in the groove 3. It is of such thickness that it extends above the surface of the rim and part of it lies outside of the movable tire flange. It takes from the flange the pressure acting in an outward direction, and bears against the shoulder or stop provided by the outer wall of the groove 3 near the edge of the rim. The flange 4 is formed on its bottom or inner periphery with one or more transverse grooves 8 extending inwardly from the inclined portion 5. One or more locking staples 9 are arranged transversely on the rim body with their ends projecting through the body and headed upon its inner periphery as indicated at 10. The staple 9 is so disposed as to project into the groove 8 and when the flange 4 is in its proper position to lie intermediate the inner and outer sides thereof, thus being concealed and positioned out of contact with the tire, not shown.

In removing the detachable flange it is first forced inward toward the opposite side of the rim so as to uncover the locking ring 6 and allow the same to be sprung out of the groove 3 and removed from the rim body. The flange 4 is then free to be moved backward or outwardly and disengaged from the rim body, the staple 9 engaging in the groove 8 acting as a guide and preventing twisting or jamming of the flange as it is being removed. When it is desired to replace the flange, the same is slipped over the rim body, the groove 8 registered with the staple 9 and the flange then forced inwardly or far enough on the rim body 1 to allow the locking ring to be placed on the rim body and its inset portion 7 to engage in the groove 3. The flange is then forced outward until its inclined portion 5 engages with the inclined portion of the locking ring and thus brought into position. It will be apparent that a portion of the staple 9 always remains in the groove 8 during the lateral movements of the flange incidentally to the removing and replacing of the locking ring. However, the more essential feature of the staple 9 and the groove 8 is to prevent the flange 4 from moving circumferentially on the rim body, or creeping, as such movement is generally known in the trade. I have also provided means for preventing this circumferential movement or creeping of the tire and in Figs. 1 and 3 have shown radial webs 11 extending vertically within the curved or overhanging portions of the flanges 2 and 4. These web portions 11 are adapted to project into the flange engaging portions of the tire which is suitably notched so as to receive the said portions. By this provision the troublesome and ungainly lugs which are now generally employed are obviated and an efficient and concealed means for fastening the tire in place and preventing creeping of the same, is had.

In Fig. 4 I have shown a modified form of tire fastening means which comprises radial pins 12 secured in the flanges as illustrated. These pins after having been set into the flanges may be brazed in place.

In Fig. 5 I have illustrated still another form of tire fastening means. This last form contemplates the extending of the staple 9 so as to have a transverse portion 14 extending entirely across the outer periphery of the rim body 1 and being turned down and passed through the flange and headed at 10 similar to the manner shown in Fig. 3. In the case of the extending of the staple 9, it will in most cases not be necessary to notch or in any way alter the tire as when the same is inflated the extended portion 14 of the staple will embed itself into the tire and thus fasten the same in position.

It is to be understood that while I have illustrated but one pair of pins 12 and one staple 9 having the extended portion 14, I may provide two or more pairs of pins 12 and likewise two or more staples 9 having extended portions 14, the number being governed by the requirements.

From the above it will be seen that the staples at 9, 14, constitute stops projecting radially outward from the outer surface of the rim, and the grooves in the inner face of the movable tire flange extend entirely across said inner face and are fitted to these stops so that the flange can be slipped inward and outward on the rim; but it is locked against circumferential movement both while so moving, and also when stationary in normal position. These stops at 9 and 14 prevent the flange 4, as stated, from moving circumferentially on the rim, and the tire itself is also prevented from circumferential movement by these stops, either prevented directly, as by engagement with the parts at 14 or prevented indirectly by means of such parts as those at 11 or 12 carried by the movable flange co-acting with the stop ribs.

I am aware that it has been proposed to employ anti-creeping stop staples arranged transversely on a wheel rim, but in the earlier proposed constructions there were no tire flanges having grooves extending across their inner faces so that the flanges could be bodily moved inward indefinitely beyond the edge of the rim to permit the removal of a lock ring, such as that at 6, or equivalent. In the earlier devices, known to me, the locking was effected by bolts and nuts, and the tire flange in those constructions never required movement inward to attain the release of the fasteners. In my construction there is an intimate relation between the lock devices, (such as the elastic ring 6), the grooves 8 and the stop ribs at 9 and 14. Here the flange must be moved inward away from the lock ring to permit the latter to be opened and removed and the grooves or passageways on the inner face of the tire flange 4 permit it to be slipped as far toward the center of the ring as is necessary.

Having now fully described my invention, what I claim and desire to secure by Letters Patent is,

1. The combination with the rim having the tire flange at one side, and the shoulder or stop at its edge on the other side and having stops projecting outward from its outer surface to prevent circumferential movement of parts fitted to said surface, of the elastic lock ring adapted to engage with and bear laterally against said edge shoulder or stop on the rim to prevent outward movement of the tire flange, and the movable tire flange inside of said lock ring, and having grooves in its inner face to receive the said outward projecting stops on the rim, whereby the flange is adapted to be slipped inward toward the center of the rim while in engagement with said shoulders or stops to permit the removal or replacing of the lock ring, substantially as set forth.

2. The combination with the rim, of the transversely movable tire flange at one side of the rim, means interposed between the rim and the movable flange preventing rotary movement of one of said parts in relation to the other but permitting the transverse sliding of the flange relative to the rim, and projections on the flange extending laterally inward into the tire and preventing the tire from moving circumferentially, substantially as set forth.

3. The combination with the rim having the fixed tire flange at one side and the shoulder or stop at its edge on the other side and having rib-like stops extending outward beyond the outer face of the rim, and the lock ring detachably seated on the rim against said edge shoulder or stop, of the movable tire flange having passages for the rib-like stops on the rim, said stops being adapted to prevent the creeping of the flange and the flange being arranged to bear outwardly against said lock ring, and means carried by the movable flange for engaging laterally with the tire to prevent its creeping, substantially as set forth.

4. A rim for vehicle wheels comprising a rim ring provided with a removable flange, locking means for the said flange disposed between the flange and the ring, and a wire staple for preventing circumferential movement of a tire extending transversely of the rim ring and having its ends passed through the ring and headed to fasten it rigidly in place.

In testimony whereof I affix my signature in presence of two witnesses.

RICHARD S. BRYANT.

Witnesses:
 A. L. PHELPS,
 M. B. SCHLEY.